(12) United States Patent
Kawami et al.

(10) Patent No.: US 9,268,112 B2
(45) Date of Patent: Feb. 23, 2016

(54) LENS BARREL

(71) Applicant: PANASONIC CORPORATION, Osaka (JP)

(72) Inventors: Yui Kawami, Osaka (JP); Fumio Shinano, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/257,525

(22) Filed: Apr. 21, 2014

(65) Prior Publication Data

US 2014/0313604 A1    Oct. 23, 2014

(30) Foreign Application Priority Data

Apr. 23, 2013 (JP) ................. 2013-089974
Mar. 14, 2014 (JP) ................. 2014-051508

(51) Int. Cl.
*G02B 7/02* (2006.01)
*G02B 7/10* (2006.01)

(52) U.S. Cl.
CPC ............... *G02B 7/102* (2013.01); *G02B 7/025* (2013.01)

(58) Field of Classification Search
CPC ........................................................ G02B 7/04
USPC ........................................................ 359/823
See application file for complete search history.

(56) References Cited

U.S. PATENT DOCUMENTS

2010/0220402 A1    9/2010  Santo et al.
2013/0044381 A1*   2/2013  Ito ................................. 359/823

FOREIGN PATENT DOCUMENTS

JP    2010-224526 A    10/2010

* cited by examiner

*Primary Examiner* — James Jones
(74) *Attorney, Agent, or Firm* — McDermott Will & Emery LLP (57) ABSTRACT

A lens barrel of the disclosure includes: a first frame which has a lens and an adhesive reservoir which is provided at a position projecting from the lens in a radial direction of the lens with an indentation formed between the lens and the adhesive reservoir, the first frame holding the lens by injection of an adhesive into the adhesive reservoir; and a second frame which is movable relative to the first frame in an optical axis direction of the lens, the second frame having a through hole formed at a place corresponding to the adhesive reservoir as viewed in the optical axis direction.

10 Claims, 14 Drawing Sheets

LENS BARREL

RELATED APPLICATIONS

This application claims the benefit of Japanese Application No. 2013-089874, filed on Apr. 23, 2013 and Japanese Application No. 2014-051508, filed Mar. 14, 2014, the disclosures of which are incorporated by reference herein.

TECHNICAL FIELD

The disclosure relates to a lens barrel, and more particularly to an interchangeable lens detachably mountable on a camera or a lens barrel unit fixed to a camera, and the like.

BACKGROUND ART

Unexamined Japanese Patent Publication No. 2010-224526 discloses a lens barrel used in a digital still camera. The lens barrel disclosed in the literature is developed for miniaturizing the camera.

SUMMARY OF THE INVENTION

It is an object of the disclosure to provide a lens barrel effective for achieving the further miniaturization of a camera.

A lens barrel according to the disclosure includes: a first frame which has a lens and an adhesive reservoir which is provided at a position projecting from the lens in a radial direction of the lens with an indentation formed between the lens and the adhesive reservoir, the first frame holding the lens by injection of an adhesive into the adhesive reservoir; and a second frame which is movable relative to the first frame in an optical axis direction of the lens, the second frame having a through hole formed at a place corresponding to the adhesive reservoir as viewed in the optical axis direction.

The disclosure provides a lens barrel effective for further enhancing the miniaturization of a camera.

DESCRIPTION OF EMBODIMENTS

Hereinafter, an embodiment will be described in detail by reference to drawings appropriately. However, the excessively detailed explanation may be omitted when appropriate. For example, the detailed explanation of well-known matters or the repeated explanation of the substantially same constitution may be omitted. These are taken for preventing the explanation made hereinafter from being unnecessarily redundant, thus facilitating the understanding of the disclosure by those who are skilled in the art.

Inventors of the disclosure provide the attached drawings and the explanation made hereinafter for enabling those who are skilled in the art to sufficiently understand the disclosure, and the subjects defined in CLAIMS are not intended to be restricted by the attached drawings and the explanation made hereinafter.

(First Exemplary Embodiment)

Hereinafter, the first embodiment is explained by reference to drawings.

[1. Overall Constitution of Interchangeable Lens 900]

Figure 1:
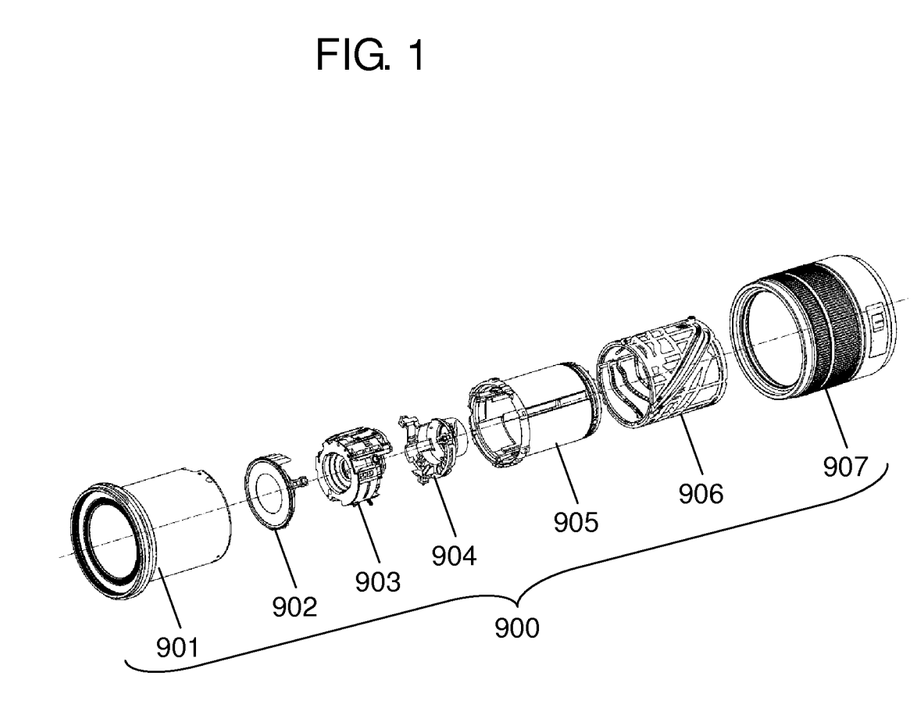
FIG. 1 is an exploded perspective view of an interchangeable lens according to a first embodiment.

The overall constitution of interchangeable lens 900 is explained by reference to FIG. 1. FIG. 1 is an exploded perspective view of interchangeable lens 900.

Interchangeable lens 900 is constituted of first group unit 901, second group unit 902, third-and-fourth group unit 903, fifth group unit 904, rectilinear fixed frame 905, cam cylinder 906, and exterior unit 907.

Interchangeable lens 900 is completed by assembling the respective parts in the following order. Firstly, rectilinear fixed frame 905, fifth group unit 904, third-and-fourth group unit 903, and second group unit 902 are assembled to cam cylinder 906 in this order. Thereafter, cam cylinder 906 to which the respective parts are assembled is assembled to first group unit 901. Lastly, first group unit 901 to which cam cylinder 906 is assembled is assembled to exterior unit 907. Interchangeable lens 900 is completed by assembling the respective parts in this order.

Interchangeable lens 900 is configured such that, when a zoom ring mounted on exterior unit 907 is rotated, cam cylinder 906 is rotated along with the rotation of the zoom ring. Interchangeable lens 900 is also configured such that, when cam cylinder 906 is rotated, first group unit 901, second group unit 902, third-and-fourth group unit 903, and fifth group unit 904 move in an optical axis direction. The respective units include cam followers which are engaged with cam grooves formed on cam cylinder 906. Further, the respective units include regulating protrusions which are engaged with restricting grooves formed on rectilinear fixed frame 905. With this constitution, the respective units are configured to be movable in the optical axis direction relative to rectilinear fixed frame 905 and cam cylinder 906.

Although not shown in the drawing, a light blocking sheet described later is arranged between first group unit 901 and second group unit 902.

[2. Parts Forming Third-and-Fourth Group Unit 903]

Figure 2A:
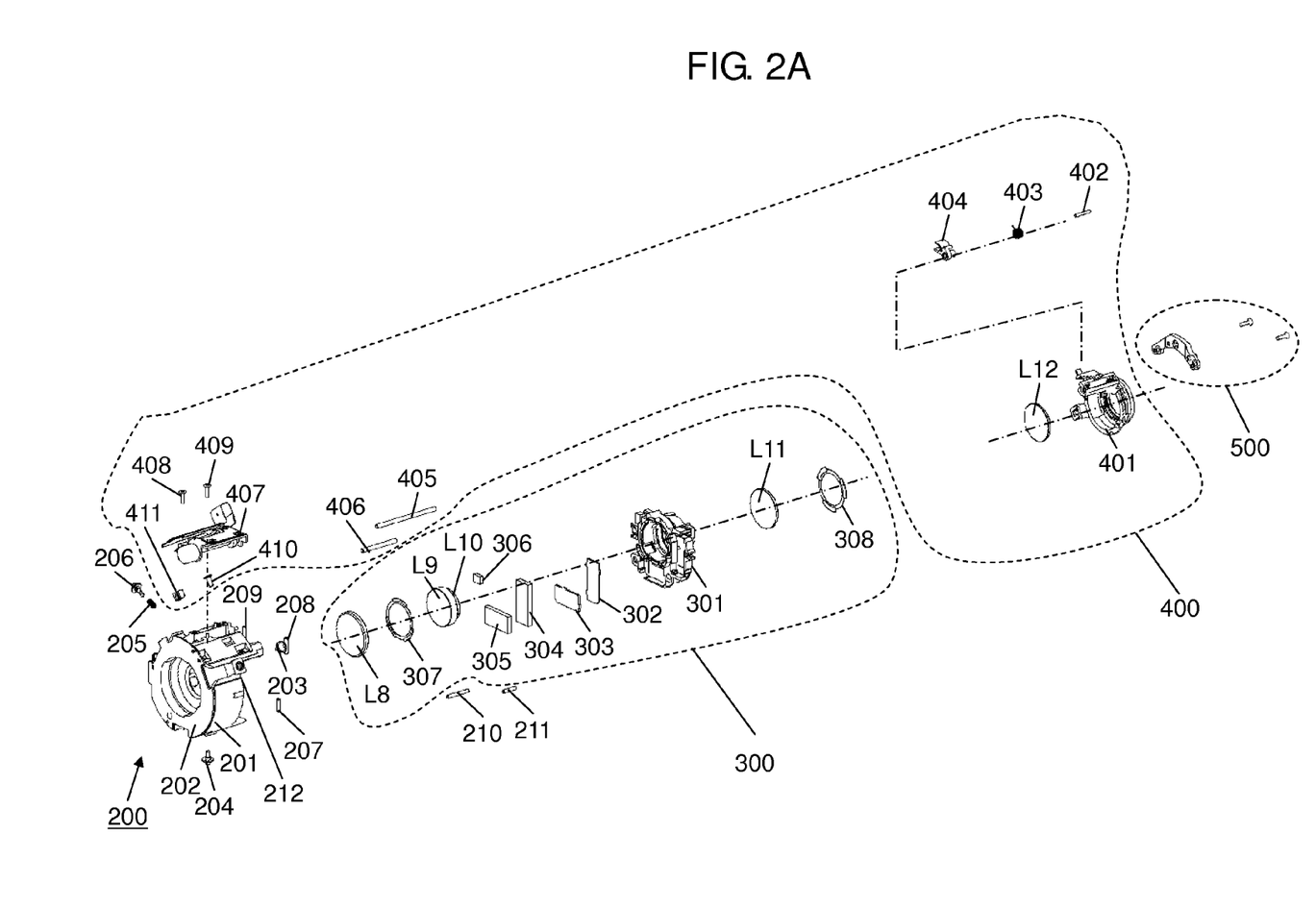
FIG. 2A is an exploded perspective view of third-and-fourth group unit according to the first embodiment.
Figure 2B:
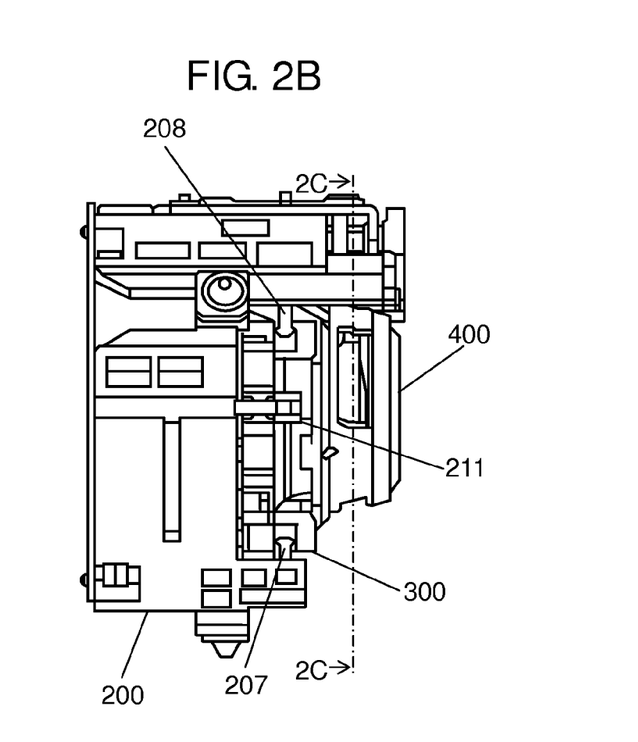
FIG. 2B is a side view of the third-and-fourth group units according to the first embodiment.
Figure 2C:
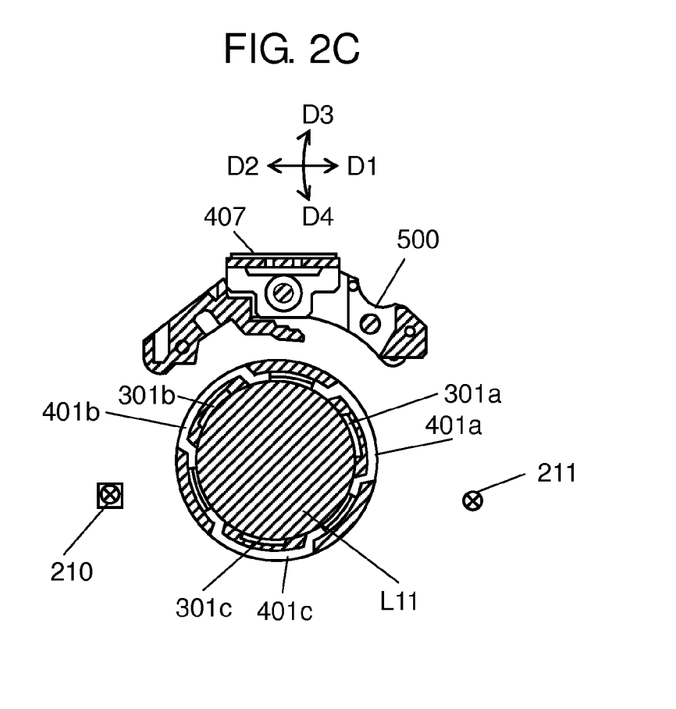
FIG. 2C is a cross-sectional view taken along line 2C-2C in FIG. 2B.

Next, parts which constitute third-and-fourth group unit 903 are explained by reference to FIG. 2A to FIG. 2C. FIG. 2A is an exploded perspective view of third-and-fourth group unit 903, FIG. 2B is a side view of third-and-fourth group unit 903, and FIG. 2C is a cross-sectional view taken along line 2C-2C in FIG. 2B.

As shown in FIG. 2A, third-and-fourth group unit 903 is constituted of diaphragm unit 200, third group unit 300, fourth group unit 400, and shaft holding portion 500.

Diaphragm unit 200 is constituted of diaphragm base frame 201, diaphragm cover 202, cam pins 203 and 204, cam pin spring 205, backlash adjusting cam pin 206, slide shafts 207, 208, and 209, movement restricting pin 210, rotary shaft 211, and restricting projection 212.

When cam cylinder 906 shown in FIG. 1 is rotated, the rotation of restricting projections 212 (one restricting member 212 shown in the drawing but two other restricting projections 212 not shown in the drawing) is restricted by rectilinear fixed frame 905 shown in FIG. 1. Further, when cam cylinder 906 is rotated, cam pins 203 and 204 and backlash adjusting cam pin 206 move along the cam grooves formed on cam cylinder 906. With such an operation, diaphragm unit 200 moves in the optical axis direction. Slide shafts 207, 208, and 209, movement restricting pin 210, and rotary shaft 211 are used for realizing the blur correction performed by third group unit 300. The detailed explanation of the blur correction is made later.

Third group unit 300 is constituted of third group frame 301, yokes 302, and 303, magnets 304 and 305, position-detecting-sensor-use magnet 306, light blocking sheets 307 and 308, and lenses L8, L9, L10, and L11.

Third group unit 300 is movable in a plane perpendicular to an optical axis of interchangeable lens 900 due to an interaction between a coil not shown in the drawing which is mounted in diaphragm unit 200 and magnets 304 and 305. That is, lenses L8 to L11 realize a blur correcting function in the lenses.

To be more specific, as shown in FIG. 2B, the movement of third group unit 300 in the optical axis direction of interchangeable lens 900 is restricted by slide shafts 207 and 208 and slide shaft 209 not shown in the drawing. As shown in FIG. 2C, third group unit 300 moves in a plane perpendicular to the optical axis of interchangeable lens 900 using rotary shaft 211 as an axis. Movement restricting pin 210 is inserted into a hole formed in third group unit 300. Accordingly, a movable range of third group unit 300 within the plane perpendicular to the optical axis of interchangeable lens 900 is restricted by a size of the hole formed in third group unit 300. With this constitution, third group unit 300 is movable within a restricted range in a plane perpendicular to the optical axis of interchangeable lens 900. To be more specific, third group unit 300 can perform the translational movement in a D1-D2 direction and can perform the rotational movement in a D3-D4 direction with reference to rotary shaft 211.

As shown in FIG. 2A, lens L8 is used for the optical adjustment of whole third group unit 300 as an aligning lens. That is, it is possible to impart a higher degree of optical performance to third group unit 300 with the use of lens L8. In this embodiment, whole third group unit 300 including four lenses is used for the blur correction. Accordingly, the blur correction performance of whole interchangeable lens 900 is relatively high.

Third group unit 300 holds four lenses L8 to L11. Third group frame 301 is formed in a shape projecting toward an image surface side in order to hold four lenses L8 to L11.

Fourth group unit 400 is constituted of fourth group frame 401, focus rack pin 402, focus rack spring 403, focus rack 404, shafts 405 and 406, focus motor unit 407, screws 408 and 409, 410, photo interrupter 411, and lens L12.

Focus motor unit 407 is fixed to diaphragm unit 200 using screws 408, 409, and 410. Shafts 405 and 406 are press-fitted into holes not shown in the drawing which are formed in diaphragm unit 200. Fourth group frame 401 of fourth group unit 400 are supported by shafts 405 and 406 in a movable manner in the optical axis direction. The movement of fourth group frame 401 in a plane perpendicular to the optical axis of interchangeable lens 900 is restricted by shafts 405 and 406. Fourth group frame 401 is moved in the optical axis direction of interchangeable lens 900 by a drive force generated by focus motor unit 407.

[3. Constitution of Second Group Unit 902]

Figure 3A:
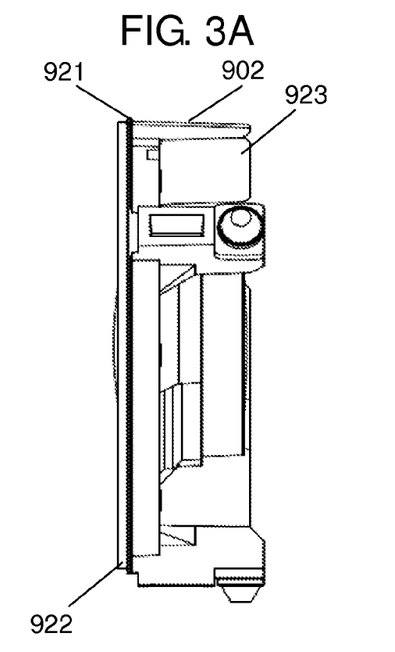
FIG. 3A is a side view of a second group unit according to the first embodiment.
Figure 4:
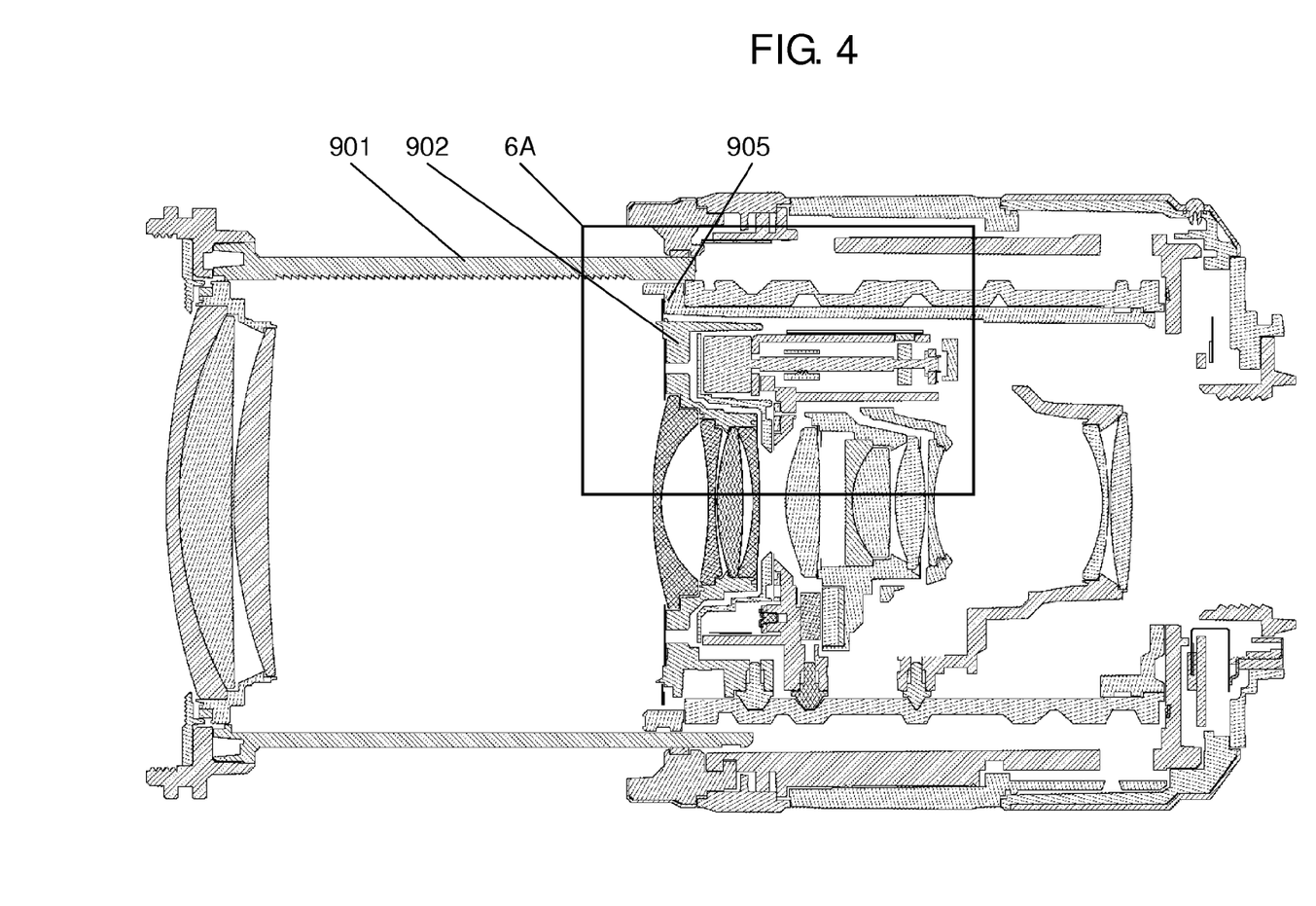
FIG. 4 is a cross-sectional view of the interchangeable lens at the time of telephotographing according to the first embodiment.
Figure 5:
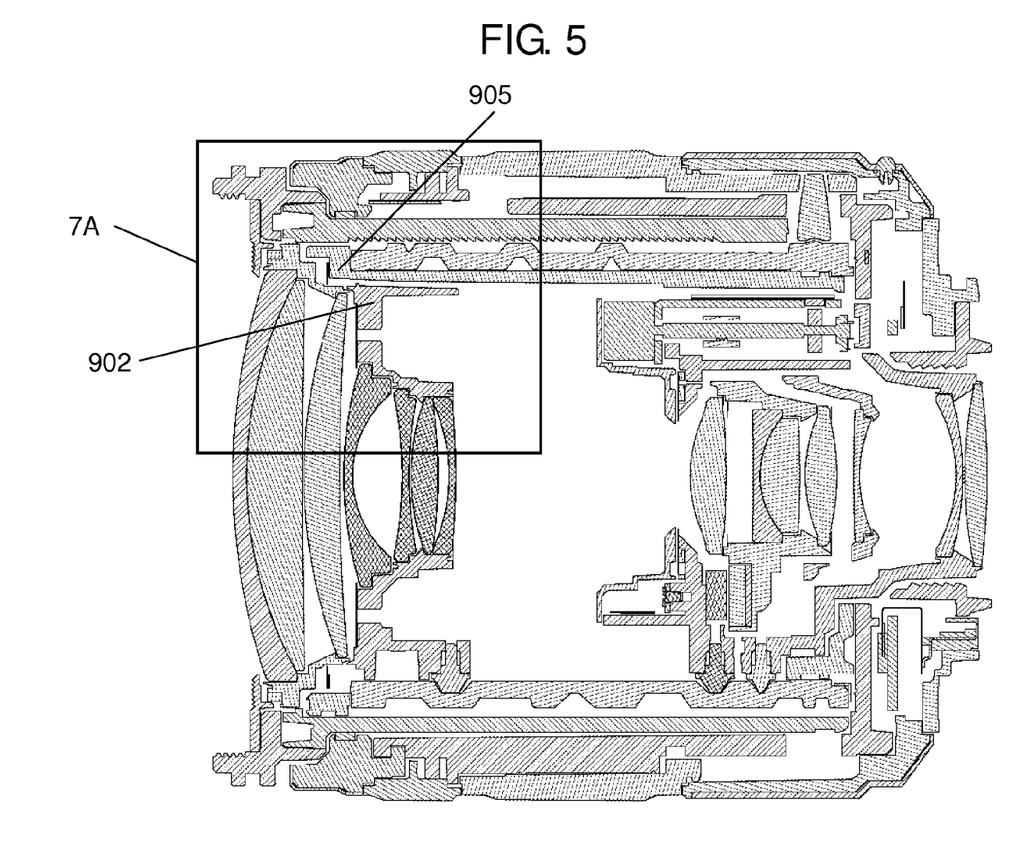
FIG. 5 is a cross-sectional view of the interchangeable lens at the time of wide-angle photographing according to the first embodiment.
Figure 6A:
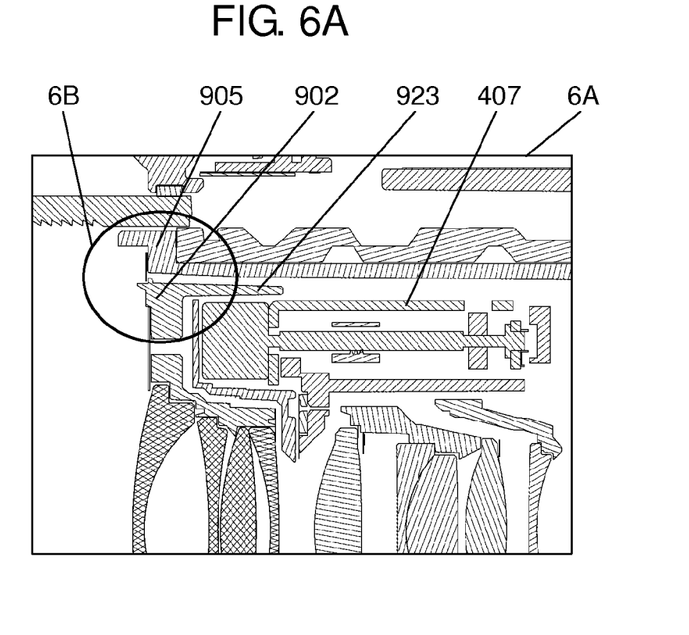
FIG. 6A is an enlarged view showing a portion indicated by symbol 6A in FIG. 4.

Next, the constitution of second group unit 902 is explained by reference to FIG. 3A to FIG. 7. FIG. 3A is a side view of second group unit 902, FIG. 3B is a perspective view of second group unit 902, FIG. 4 is a cross-sectional view of interchangeable lens 900 at the time of telephotographing, FIG. 5 is a cross-sectional view of interchangeable lens 900 at the time of wide-angle photographing, FIG. 6A is an enlarged view showing a portion indicated by symbol 6A in FIG. 4, FIG. 6B is an enlarged view showing a portion indicated by symbol 6B in FIG. 6A, and FIG. 7 is an enlarged view showing a portion indicated by symbol 7A in FIG. 5.

In this embodiment, third-and-fourth group unit 903 includes diaphragm unit 200 for diaphragm adjustment, third group unit 300 for blurring correction, and fourth group unit 400 for focus adjustment. In this manner, third-and-fourth group unit 903 includes a large number of units. Third-and-fourth group unit 903 further includes a plurality of parts such as motors necessary for driving the respective units and mechanical parts. Accordingly, third-and-fourth group unit 903 includes a plurality of holes and gaps for arranging the respective parts on third-and-fourth group unit 903 therein. As a result, third-and-fourth group unit 903 has the constitution which is liable to allow undesired light to easily pass therethrough. In this embodiment, second group unit 902 is configured to decrease an amount of undesired light which enters the inside of rectilinear fixed frame 905 from the first group unit 901 side.

Figure 3B:
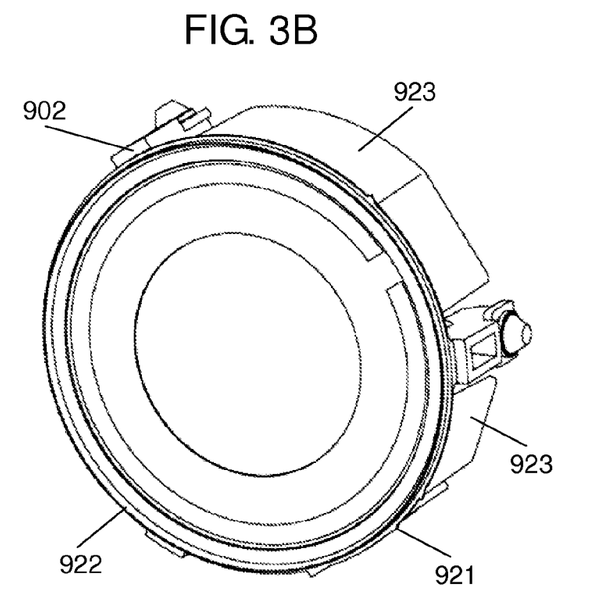
FIG. 3B is a perspective view of the second group unit according to the first embodiment.

As shown in FIG. 3A and FIG. 3B, second group unit 902 includes projection 921 which projects toward an outer peripheral side, projection 922 which projects toward an object to be imaged, and light blocking walls 923 which project toward an image surface side.

Figure 6B:
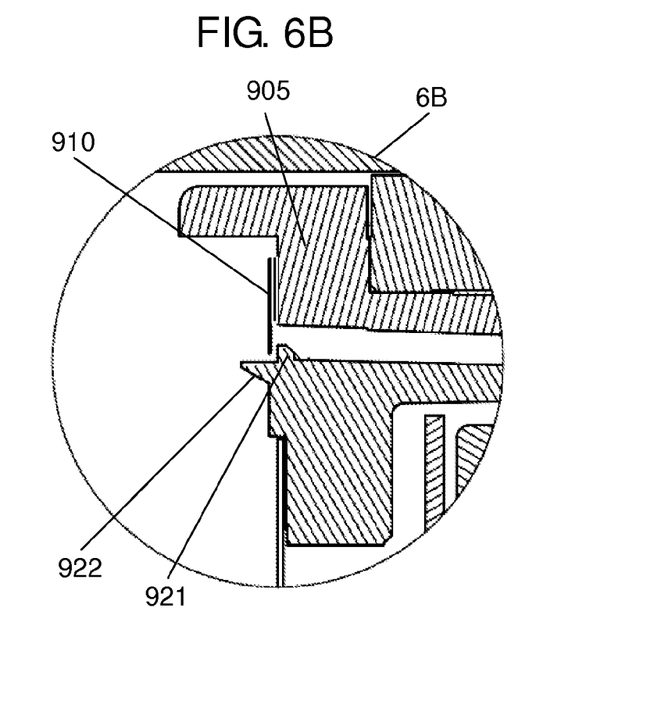
FIG. 6B is an enlarged view showing a portion indicated by symbol 6B in FIG. 6A.
Figure 7:
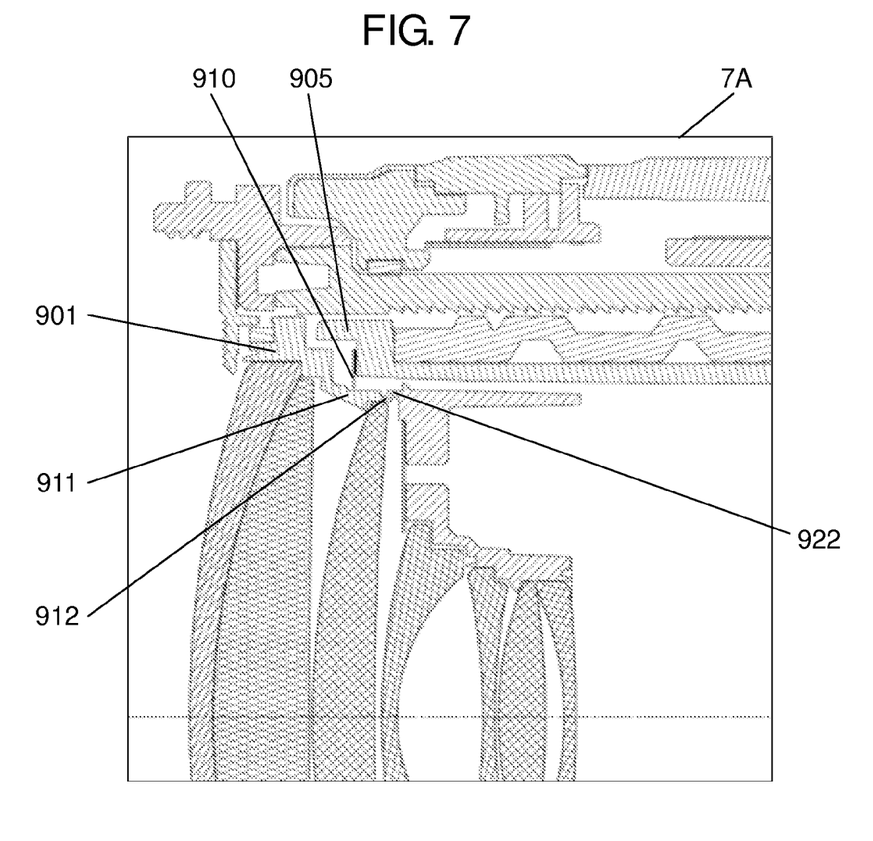
FIG. 7 is an enlarged view showing a portion indicated by symbol 7A in FIG. 5.

As shown in FIG. 6B, in the case where interchangeable lens 900 is at a telephotographing position, projections 921 and 922 decrease an amount of undesired light which enters the inside of rectilinear fixed frame 905 due to the relationship between projections 921 and 922 and light blocking sheet 910 mounted on rectilinear fixed frame 905. To be more specific, as viewed in the optical axis direction of interchangeable lens 900, a gap formed between second group unit 902 and rectilinear fixed frame 905 is sealed by light blocking sheet 910 and projection 921. Projection 922 which projects in the optical axis direction of interchangeable lens 900 is provided so as to seal a gap formed between light blocking sheet 910 and projection 921. With this constitution, a possibility that undesired light enters a gap formed between second group unit 902 and rectilinear fixed frame 905 is decreased.

Particularly, when interchangeable lens 900 is at a telephotographing position, as shown in FIG. 4, interchangeable lens 900 assumes a state where first group unit 901 is fully extended toward an object to be imaged. Accordingly, if light blocking sheet 910 is not provided, undesired light easily passes through the gap formed between second group unit 902 and rectilinear fixed frame 905. To the contrary, in this embodiment, light blocking sheet 910 is mounted on rectilinear fixed frame 905. Accordingly, undesired light hardly enters the gap formed between second group unit 902 and rectilinear fixed frame 905. Light blocking sheet 910 is arranged at a position where light blocking sheet 910 does not interfere with second group unit 902. Accordingly, when second group unit 902 moves in the optical axis direction relative to rectilinear fixed frame 905, a rubbing sound is hardly generated between light blocking sheet 910 and second group unit 902. Further, it is possible to decrease a possibility that a user feels discomfort in his/her hand when the user manually manipulates the zoom ring.

Further, as shown in FIG. 6A, when interchangeable lens 900 is at a telephotographing position, light blocking walls 923 of second group unit 902 decrease an amount of undesired light which enters focus motor unit 407 side of third-and-fourth group unit 903. That is, when interchangeable lens 900 is at a telephotographing position, light blocking walls 923 decrease an amount of undesired light which passes through the gaps formed between the motors and the mechanism parts of third-and-fourth group unit 903 after passing through the gap formed between second group unit 902 and rectilinear fixed frame 905.

As shown in FIG. 7, light blocking sheet 910 is configured not to interfere with side wall portion 911 of first group unit 901 when interchangeable lens 900 is at a wide-angle position. Further, end portion 912 of first group unit 901 and projection 922 of second group unit 902 are configured not to interfere with each other. With this constitution, when first group unit 901 moves in the optical axis direction relative to rectilinear fixed frame 905, a rubbing sound is hardly generated between light blocking sheet 910 and first group unit 901. Further, it is possible to decrease a possibility that a user feels discomfort in his/her hand when the user manually manipulates the zoom ring.

[4. Specific Constitution of Third-and-fourth Group Unit 903]

Figure 8:
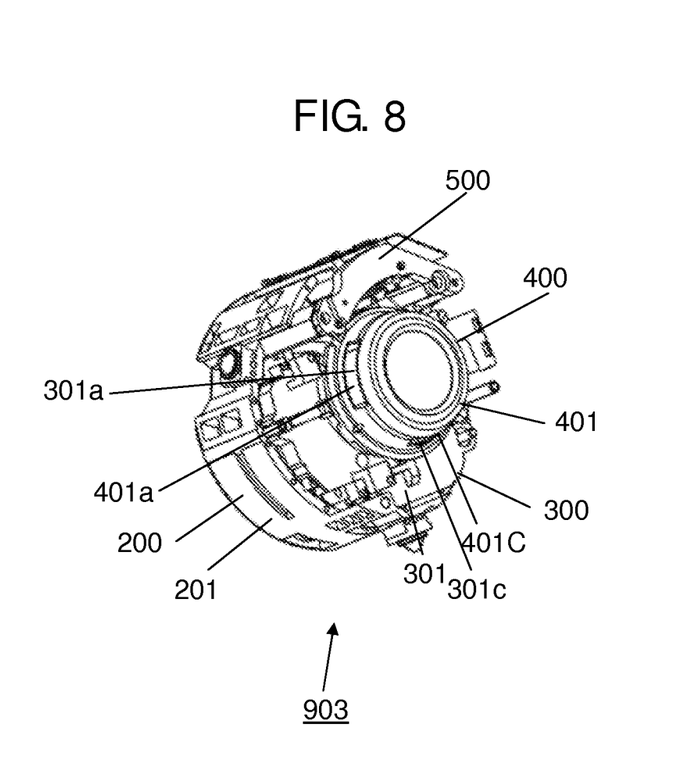
FIG. 8 is a perspective view of the third-and-fourth group units according to the first embodiment.

Next, the specific constitution of third-and-fourth group unit 903 is explained by reference to FIG. 2C and FIG. 8 to FIG. 10. FIG. 8 is a perspective view of third-and-fourth group unit 903 as viewed from an image surface side, FIG. 9 is a perspective view for explaining third group unit 300, and FIG. 10 is a perspective view for explaining fourth group unit 400.

As shown in FIG. 8, third-and-fourth group unit 903 includes diaphragm unit 200, third group unit 300, fourth group unit 400, and shaft holding portion 500. As shown in FIG. 2C, in third-and-fourth group unit 903, adhesive reservoir 301a of third group unit 300 and through hole 401a of fourth group unit 400 are arranged at places corresponding to each other. Adhesive reservoir 301b of third group unit 300 and through hole 401b of fourth group unit 400 are arranged at places corresponding to each other. Adhesive reservoir 301c of third group unit 300 and through hole 401c of fourth group unit 400 are arranged at places corresponding to each other. Advantageous effects acquired by the above-mentioned constitution of third group unit 300 and fourth group unit 400 are described later.

Figure 9:
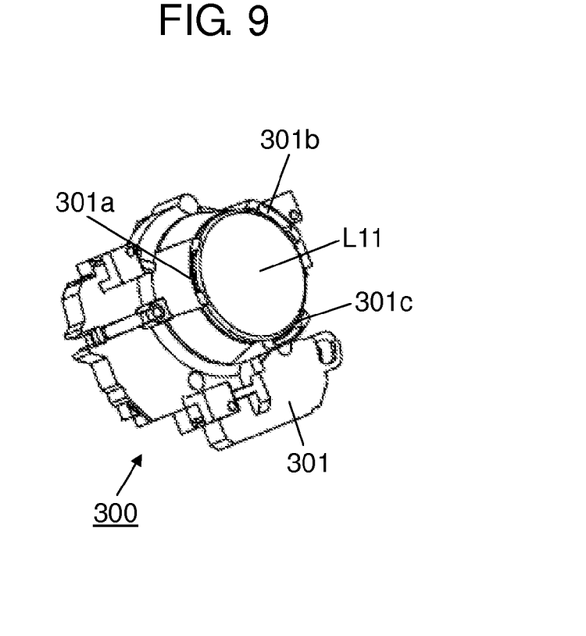
FIG. 9 is a perspective view of the third group unit according to the first embodiment.

As shown in FIG. 9, third group unit 300 is constituted by assembling respective parts onto third group frame 301. Third group frame 301 includes adhesive reservoirs 301a, 301b, and 301c. Adhesive reservoirs 301a, 301b, 301c are arranged at positions projecting in the radial direction of lens L11. Indentations are formed between adhesive reservoirs 301a, 301b, and 301c and lens L11. By placing lens L11 in adhesive reservoirs 301a, 301b, and 301c and by injecting an adhesive into adhesive reservoirs 301a, 301b, and 301c, lens L11 is held by third group frame 301. Since lens L11 is fixed to third group frame 301 using an adhesive material, compared to a case where lens L11 is fixed by caulking, the optical performance of lens L11 can be maintained at a higher level. Further, while ensuring adhesive reservoirs 301a, 301b, and 301c, it is possible to prevent portions of third group frame 301 other than adhesive reservoirs 301a, 301b, and 301c from projecting toward an image surface side.

Figure 10:
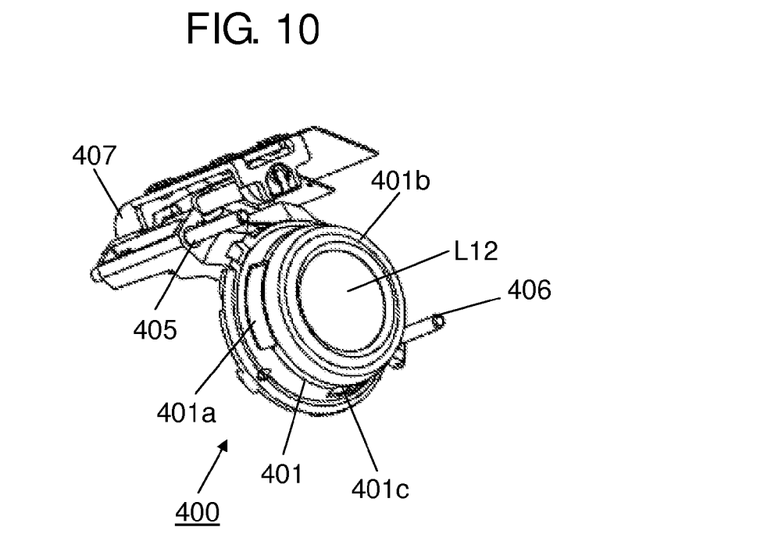
FIG. 10 is a perspective view of the fourth group unit according to the first embodiment.

As shown in FIG. 10, fourth group unit 400 is constituted by assembling respective parts onto fourth group frame 401. Fourth group frame 401 includes through holes 401a, 401b, and 401c. As described above, through holes 401a, 401b, and 401c are arranged at places corresponding to adhesive reservoir 301a, 301b, and 301c in a state where fourth group unit 400 is assembled to third group unit 300. In this embodiment, third group unit 300 is movable in a plane perpendicular to an optical axis of interchangeable lens 900. Accordingly, sizes of respective through holes 401a, 401b, and 401c are adjusted such that a movable range of third group unit 300 is not restricted by through holes 401a, 401b, and 401c.

Lens L12 is fixed to fourth group frame 401 using an adhesive material. Shafts 405 and 406 are inserted into fourth group frame 401. Fourth group frame 401 is movable along shafts 405 and 406. Focus motor unit 407 is mounted on fourth group frame 401. Fourth group unit 400 is movable in the optical axis direction of interchangeable lens 900 due to power obtained from focus motor unit 407.

[5. Movable Range of Fourth Group Unit 400 and Constitution of Fourth Group Unit 400 Shown in Cross-Sectional View]

Figure 11:
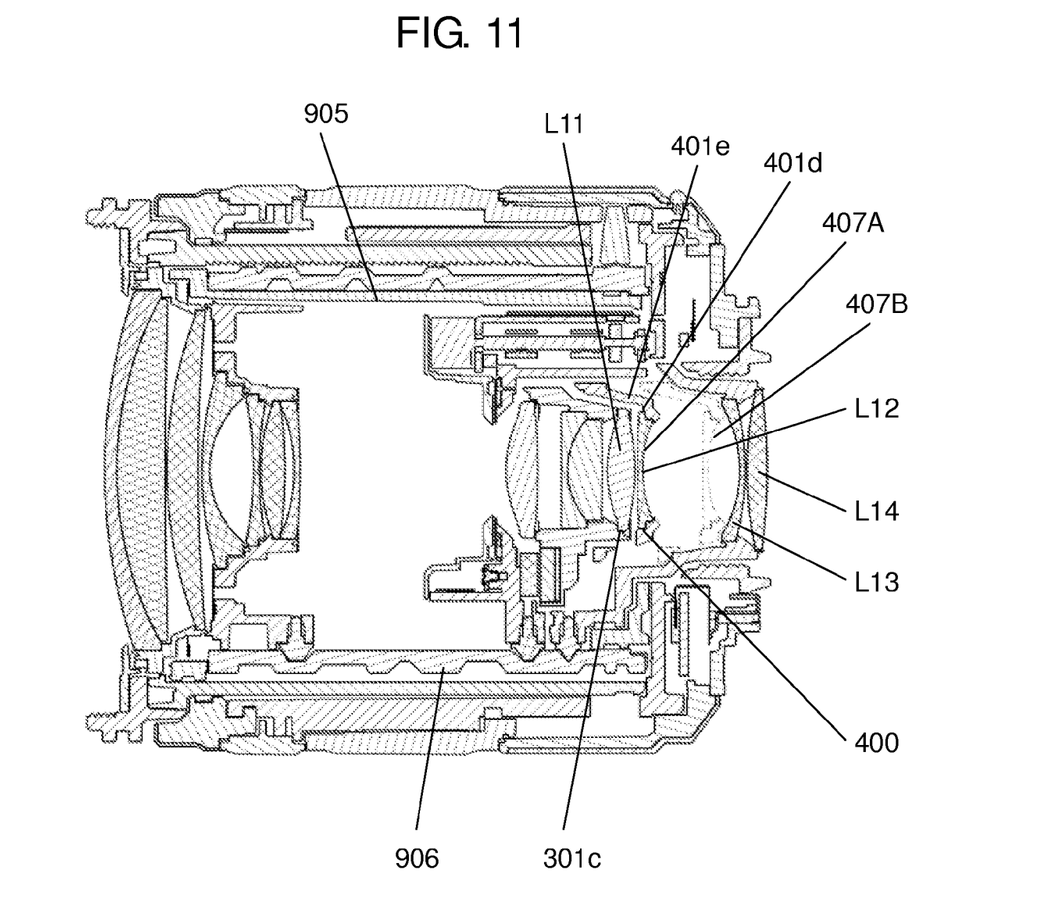
FIG. 11 is a cross-sectional view for explaining a movable range of the fourth group unit of the interchangeable lens at the time of wide-angle photographing according to the first embodiment.
Figure 12:
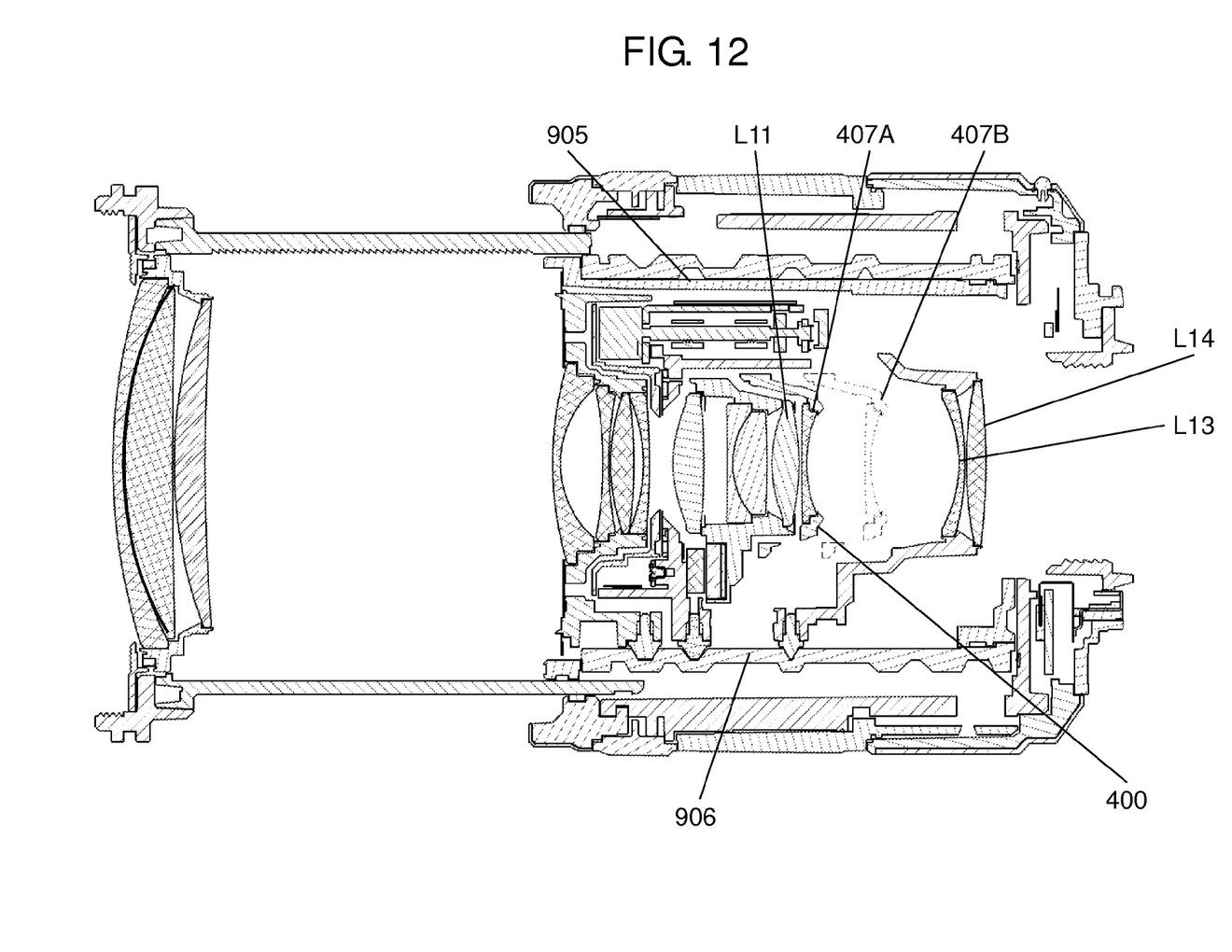
FIG. 12 is a cross-sectional view for explaining a movable range of the fourth group unit of the interchangeable lens at the time of telephotographing according to the first embodiment.
Figure 13A:
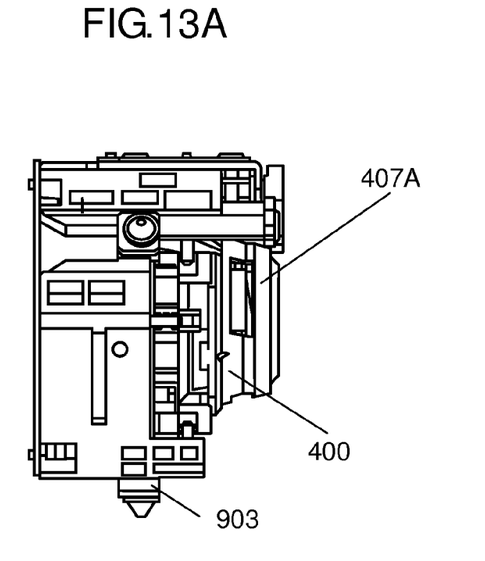
FIG. 13A is a side view of the third-and-fourth group units showing a state where the fourth group unit is made to approach closest to an object-to- be-imaged side.
Figure 13B:
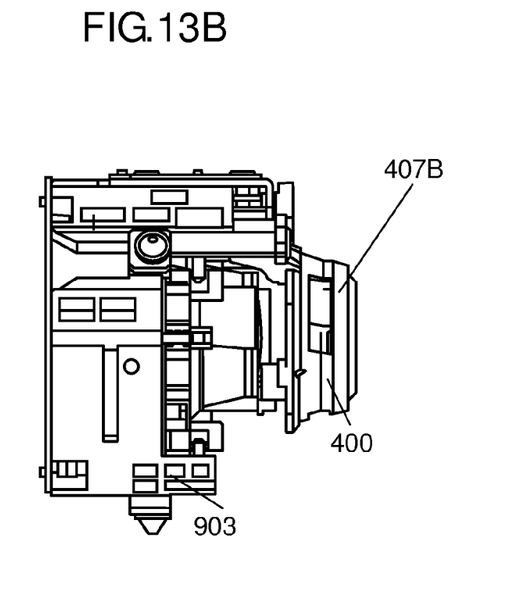
FIG. 13B is a side view of the third-and-fourth group units showing a state where the fourth group unit is made to approach closest to an image surface.

Next, a movable range of fourth group unit 400 and the constitution of fourth group unit 400 shown in the cross-sectional view are explained by reference to FIG. 8 to FIG. 13. FIG. 11 is a cross-sectional view for explaining a movable range of fourth group unit 400 of interchangeable lens 900 at the time of wide-angle photographing. FIG. 12 is a cross-sectional view for explaining a movable range of fourth group unit 400 of interchangeable lens 900 at the time of telephotographing. FIG. 13A is a side view of third-and-fourth group unit 903 showing a state where fourth group unit 400 is made to approach closest to an object-to-be-imaged side, and FIG. 13B is a side view of third-and-fourth group unit 903 showing a state where fourth group unit 400 is made to approach closest to an image surface side.

As shown in FIG. 11, fourth group unit 400 is configured to be movable between a position close to lens L11 of third group unit 300 (state 407A in FIG. 11) and a position close to lens L13 of fifth group unit 904 (state 407B shown in FIG. 11) when interchangeable lens 900 is at a wide-angle photographing position. Further, as shown in FIG. 12, fourth group unit 400 is configured to be movable between a position close to lens L11 of third group unit 300 (state 407A in FIG. 12) and a position close to lens L13 of fifth group unit 904 (state 407B shown in FIG. 12) when interchangeable lens 900 is at a telephotographing position. Still further, as can be understood from a change of fourth group unit 400 from a state shown in FIG. 13A to a state shown in FIG. 13B, fourth group unit 400 is configured to be movable in such a manner that a portion of fourth group unit 400 which holds lens L12 projects when a state of fourth group unit 400 is changed from state 407A to state 407B shown in FIG. 11 and FIG. 12. With this constitution, interchangeable lens 900 can be miniaturized in the whole length direction in the relation with the shape of fifth group unit 904.

As shown in FIG. 11, fourth group unit 400 has a shape which conforms to a shape of a projecting frame of third group unit 300. That is, a portion of the projecting frame of third group unit 300 is inserted into tapered accommodating portion 401e formed in fourth group unit 400. With this constitution, fourth group unit 400 is movable to a position closer to third group unit 300. Through holes 401a, 401b, and 401c are formed in accommodating portion 401e.

Lens L12 is fixed to fourth group unit 400 by adhesion from an object-to-be-imaged side. As shown in FIG. 11, adhesive reservoirs 401d (one adhesive reservoir 401d shown in the drawing and two other adhesive reservoirs 401d not shown in the drawing) are formed on an object-to-be-imaged side of fourth group unit 400. Adhesive reservoirs 401d are displaced in phase from adhesive reservoirs 301a, 301b, and 301c. In other words, adhesive reservoirs 401d are arranged at positions different from the positions of adhesive reservoirs 301a, 301b, and 301c of lens L11 in the circumferential direction of lens L11. That is, the positions of the adhesive reservoirs for fixing lens L11 and the positions of the adhesive reservoirs for fixing lens L12 do not overlap with each other. With this constitution, even when fourth group unit 400 is made to approach close to third group unit 300, the interface between the adhesive reservoirs can be further decreased. Further, fourth group unit 400 can approach closer to third group unit 300. As a result, it is possible to realize the further miniaturization of interchangeable lens 900.

As shown in FIG. 11, fourth group unit 400 has a shape which conforms to an object-to-be-imaged-side shape of fifth group unit 904 on an image surface side thereof. Accordingly, fourth group unit 400 can be positioned closer to lens L13 of fifth group unit 904 (state 407B in FIG. 11). Further, in fourth group unit 400, the adhesive reservoirs for lens L12 are arranged on an object-to-be-imaged side. Accordingly, it is possible to make fourth group unit 400 approach closer to fifth group unit 904.

[6. Advantageous Effects Acquired by Forming Through Holes 401a, 401b, and 401c in Fourth Group Unit 400.

Figure 14:
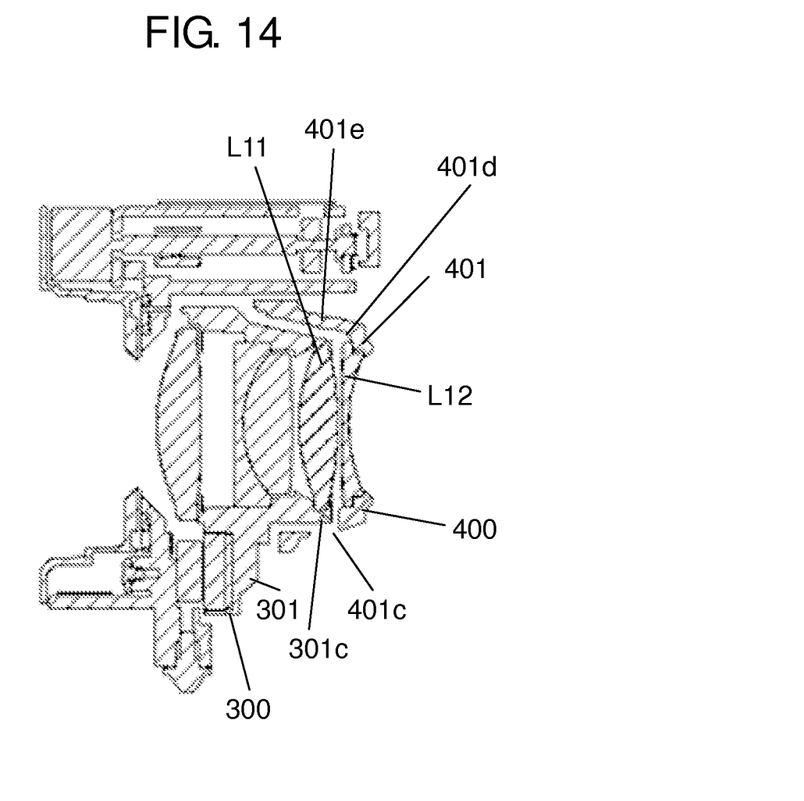
FIG. 14 is a cross-sectional view showing the positional relationship of the third-and-fourth group units according to the first embodiment.

Next, advantageous effects acquired by forming through holes 401a, 401b, and 401c in fourth group unit 400 are explained by reference to FIG. 14. FIG. 14 is a cross-sectional view for explaining the positional relationship between third group unit 300 and fourth group unit 400.

FIG. 14 shows a state where third group unit 300 and fourth group unit 400 approach closest to each other in the optical axis direction of interchangeable lens 900. In such a state, as viewed in the direction of a particular axis existing on a plane perpendicular to the optical axis of interchangeable lens 900, a portion of adhesive reservoir 301c which is formed in third group frame 301 overlaps with an imaginary surface formed by an inner edge of through hole 401c formed in fourth group unit 400. Although not shown in the drawing, a portion of adhesive reservoir 301a which is formed in third group frame 301 overlaps with an imaginary surface formed by an inner edge of through hole 401a. Further, a portion of adhesive reservoir 301b which is formed in third group frame 301 overlaps with an imaginary surface formed by an inner edge of through hole 401b. In other words, if third group unit 300 and fourth group unit 400 are made to approach to each other to an extent substantially equal to the extent in the case shown in FIG. 14 in a state where through holes 401a, 401b, and 401c are not formed in fourth group unit 400, adhesive reservoirs 301a, 301b, and 301c are brought into contact with an inner surface of accommodating portion 401e. That is, according to this embodiment, third group unit 300 and fourth group unit 400 can be made to approach closer to each other by arranging through holes 401a, 401b, and 401c at positions corresponding to adhesive reservoirs 301a, 301b, and 301c.

[7. Recapitulation]

Interchangeable lens 900 according to this embodiment includes third group frame 301 and fourth group frame 401. Third group frame 301 includes lens L11 and adhesive reservoirs 301a, 301b, and 301c. Adhesive reservoirs 301a, 301b, and 301c are formed at positions projecting from lens L11 in the radial direction of lens L11, and the indentations are formed between lens L11 and adhesive reservoirs 301a, 301b, and 301c. Third group frame 301 holds lens L11 by injection of an adhesive into adhesive reservoirs 301a, 301b, and 301c. Fourth group frame 401 is movable in the optical axis direction of lens L11 relative to third group frame 301. Through holes 401a, 401b, and 401c are formed in fourth group frame 401 at places corresponding to adhesive reservoirs 301a, 301b, and 301c respectively as viewed from the optical axis direction.

With this constitution, compared to a case where through holes 401a, 401b, and 401c are not formed in fourth group frame 401, third group frame 301 and fourth group frame 401 can be made to approach closer to each other. As a result, the whole length of interchangeable lens 900 can be further shortened.

In interchangeable lens 900, in a state where third group frame 301 and fourth group frame 401 are made to approach closest to each other, imaginary surfaces formed by the inner edges of through holes 401a, 401b, and 401c and portions of adhesive reservoirs 301a, 301b, and 301c overlap with each other.

With this constitution, third group frame 301 and fourth group frame 401 can be made to approach to each other to an extent that the imaginary surfaces formed by the inner edges of through holes 401a, 401b, and 401c and the portions of adhesive reservoirs 301a, 301b, and 301c overlap with each other. As a result, the whole length of interchangeable lens 900 can be shortened.

In interchangeable lens 900, accommodating portion 401e which accommodates a portion of third group frame 301 is formed on fourth group frame 401, accommodating portion 401e is formed in a tapered shape, and through holes 401a, 401b, and 401c are formed on the portions of accommodating portion 401e having a tapered shape.

With this constitution, third group frame 301 and fourth group frame 401 can be made to approach further closer to each other. As a result, the whole length of interchangeable lens 900 can be further shortened.

Interchangeable lens 900 includes third group frame 301 and fourth group frame 401. Third group frame 301 includes lens L11 and adhesive reservoirs 301a, 301b, and 301c. Adhesive reservoirs 301a, 301b, and 301c are arranged at positions projecting from lens L11 in the radial direction of lens L11, and the indentations are formed between lens L11 and adhesive reservoirs 301a, 301b, and 301c. Third group frame 301 is movable in a plane perpendicular to the optical axis of lens L11, and third group frame 301 holds lens L11 by injection of an adhesive into adhesive reservoirs 301a, 301b, and 301c.

Fourth group frame 401 is movable in the optical axis direction of lens L11 relative to third group frame 301. Through holes 401a, 401b, and 401c are formed in the portions of fourth group frame 401 corresponding to adhesive reservoirs 301a, 301b, and 301c as viewed in the optical axis direction of lens L11.

With this constitution, compared to a case where through holes 401a, 401b, and 401c are not formed in fourth group frame 401, third group frame 301 and fourth group frame 401 can be made to approach closer to each other. As a result, the whole length of interchangeable lens 900 can be further shortened.

(Other Exemplary Embodiments)

As has been explained above, the first embodiment is explained so as to exemplify the techniques according to the disclosure. However, the disclosure is not limited to such techniques, and various changes, replacements, additions, omissions and the like can be made thereto.

In the first embodiment, through holes 401a, 401b, and 401c are formed in fourth group unit 400. However, the present invention is not always limited to such a constitution. For example, indentations may be formed on an inner surface at positions corresponding to adhesive reservoirs 301a, 301b, and 301c without forming through holes 401a, 401b, and 401c in fourth group unit 400. By forming the indentations as described above, third group frame 301 and fourth group frame 401 can be made to approach to each other to an extent that adhesive reservoirs 301a, 301b, and 301c are not brought into contact with bottom portions of the indentations. As a result, compared to a case where the indentations are not formed on fourth group unit 400, the whole length of the lens barrel can be shortened.

The embodiment has been explained heretofore as an example of the technique according to the disclosure. For this purpose, the attached drawings and the detailed explanation are provided.

Accordingly, the constitutional elements described in the attached drawings and the detailed description may include not only the constitutional elements necessary for overcoming the problems but also constitutional elements which are unnecessary for overcoming the problems in order to exemplify the aforementioned techniques. Therefore, such unnecessary constitutional elements should not be immediately determined to be necessary for the reason that these unnecessary constitutional elements are described in the attached drawings and the detailed description.

Further, the aforementioned embodiment is merely for exemplifying the techniques according to the disclosure and, therefore, various changes, replacements, additions, omissions and the like can be made thereto within the scope of the claims and scopes equivalent thereto.

Industrial Applicability

The disclosure is applicable to the lens barrel. For example, the disclosure is applicable to an interchangeable lens which is detachable to a camera, a lens barrel unit fixed to a camera or the like.

The invention claimed is:

1. A lens barrel comprising:
   a first frame which includes a lens and an adhesive reservoir which is provided at a position projecting from the lens in a radial direction of the lens the lens being held by the first frame by an adhesive in the adhesive reservoir; and
   a second frame which is movable relative to the first frame in an optical axis direction of the lens, the second frame having a through hole formed at a place corresponding to the adhesive reservoir as viewed in the optical axis direction.

2. The lens barrel according to claim 1, wherein an imaginary plane formed by an inner edge of the through hole overlaps with a portion of the adhesive reservoir when the second frame is located at a position closest to the first frame.

3. The lens barrel according to claim 1, wherein the second frame includes an accommodating portion for accommodating a portion of the first frame, and the accommodating portion is formed in a tapered shape, and the through hole is formed in a portion of the tapered shape.

4. A lens barrel comprising:
   a first frame which includes a lens and an adhesive reservoir which is provided at a position projecting from the lens in a radial direction of the lens, the first frame being movable in a plane perpendicular to an optical axis of the lens, and the lens being held by the first frame by an adhesive in the adhesive reservoir; and
   a second frame which is movable relative to the first frame in an optical axis direction of the lens, the second frame having a through hole formed at a place corresponding to the adhesive reservoir as viewed in the optical axis direction.

5. The lens barrel according to claim 4, wherein an imaginary plane formed by an inner edge of the through hole overlaps with a portion of the adhesive reservoir when the second frame is located at a position closest to the first frame.

6. The lens barrel according to claim 4, wherein the second frame includes an accommodating portion for accommodating a portion of the first frame, and the accommodating portion is formed in a tapered shape, and the through hole is formed in a portion of the tapered shape.

7. A lens barrel comprising:
   a first frame which includes a lens and an adhesive reservoir which is provided at a position projecting from the lens in a radial direction of the lens the lens being held by the first frame by an adhesive in the adhesive reservoir; and
   a second frame which is movable relative to the first frame in an optical axis direction of the lens, the second frame having an indentation formed at a place corresponding to the adhesive reservoir as viewed in the optical axis direction.

8. The lens barrel according to claim 1, wherein a part of the adhesive reservoir is located in the through hole when the second frame is located at a position closest to the first frame.

9. The lens barrel according to claim 4, wherein a part of the adhesive reservoir is located in the through hole when the second frame is located at a position closest to the first frame.

10. The lens barrel according to claim 7, wherein a part of the adhesive reservoir is located in the indentation when the second frame is located at a position closest to the first frame.

* * * * *